United States Patent [19]

Schwarz

[11] Patent Number: 5,280,965
[45] Date of Patent: Jan. 25, 1994

[54] FORM-FITTING AND MATERIAL-LOCKING PIPE CONNECTION, IN PARTICULAR ELECTRICALLY INSULATING PIPE CONNECTION

[76] Inventor: Walter Schwarz, Engerthstrasse 237b, Vienna, Austria

[21] Appl. No.: 773,865

[22] PCT Filed: Feb. 6, 1991

[86] PCT No.: PCT/AT91/00022
 § 371 Date: Oct. 23, 1991
 § 102(e) Date: Oct. 23, 1991

[87] PCT Pub. No.: WO91/12457
 PCT Pub. Date: Aug. 22, 1991

[30] Foreign Application Priority Data
 Feb. 6, 1990 [AT] Austria .................. 245/90

[51] Int. Cl.⁵ .................................. F16L 11/12
[52] U.S. Cl. ........................ 285/53; 285/148;
  285/286; 285/363; 285/405
[58] Field of Search ............ 285/53, 148, 223, 286,
  285/363, 405

[56] References Cited

U.S. PATENT DOCUMENTS

| | | | |
|---|---|---|---|
| 2,504,634 | 4/1950 | Boschi | 285/363 X |
| 3,146,005 | 8/1964 | Peyton | 285/405 X |
| 4,147,381 | 4/1979 | Schwarz | 285/53 |

FOREIGN PATENT DOCUMENTS

| | | |
|---|---|---|
| 2702925 | 7/1978 | Fed. Rep. of Germany . |
| 7414463 | 11/1974 | France . |
| 0305478 | 12/1929 | United Kingdom ........... 285/223 |

Primary Examiner—Randolph A. Reese
Assistant Examiner—Heather Chun
Attorney, Agent, or Firm—Feiereisen & Kueffner

[57] ABSTRACT

A pipe connection, in particular an electrically insulating pipe connection, formed by interlocking or interpenetration of material between (a) an overlapping, reinforced plastic sleeve which is subdivided into a number of superimposed pipe shells that mutually support each other and which are advantageously separated from each other and can therefore be deformed independently in the axial direction of the sleeve, and b) at least one pipe, preferably overlapped by the pipe shells or layers and made, in particular, of metal. The end of the plastic sleeve is wound, pressed or cast around the end of the overlapped pipe, and the flanges of the innermost pipe shell or layer hooks onto a shoulder at each end of the overlapped pipe. The end region of the outermost pipe shell or layer may be enclosed by a coupling ring. The flanges (1'-10') of the pipe shells (1-10) or pipe layers abut on each other, possibly via an incorporated ring (20) or ring winding preferably perpendicular to the axis of the sleeve. The ring or ring winding has a projection (21), for example, which is arranged between the adjacent axial surfaces of adjacent pipe shells (7, 8; 9, 10) or pipe layers, but is preferably fixed to only one of these pipe shells (7, 8; 9, 10)

26 Claims, 2 Drawing Sheets

FORM-FITTING AND MATERIAL-LOCKING PIPE CONNECTION, IN PARTICULAR ELECTRICALLY INSULATING PIPE CONNECTION

BACKGROUND OF THE INVENTION

The invention refers to a form-fitting and material-locking pipe connection, in particular electrically insulating pipe connection between (a) an overlapping, reinforced plastic sleeve which is subdivided into a number of superimposed pipe shells or pipe layers which at their ends have a flange directed toward the axis of the sleeve and which are separated from each other so as to be deformable independently from each other in axial direction of the sleeve, and b) at least one pipe, preferably two pipes, made especially of metal which are overlapped by the pipe shells or pipe layers, with the end of the plastic sleeve being wound, pressed or cast onto the end of the overlapped pipe, and with the flanges of the innermost pipe shell or pipe layer hooking onto a shoulder provided at each end of the overlapped pipe, and with the outermost pipe shell or pipe layer being possibly enclosed at least in the end area thereof by a coupling ring.

In connections of this type, it is known (DE-OS 27 33 048) to assign a separate shoulder of the overlapped pipe to each flange of the pipe shell, with these shoulders being of stepped configuration, with the gradation starting to ascend from the pipe end. Such a design necessitates a material accumulation at the pipe ends and also a relatively long thickened section at the end of the pipe so that a considerable material accumulation in particular in case of large connections is encountered. Furthermore, the making of individual shoulders at the pipe end is cumbersome and complicated.

SUMMARY OF THE INVENTION

The invention is now based on the object to attain a simplified design of the pipe connection, and yet to retain the effect of the known connection with regard to the even and simultaneous support of the pipe shells.

This object is attained in accordance with the invention by mutually supporting the flanges of the pipe shells or pipe layers, possibly via an interposed ring or ring winding preferably arranged perpendicular to the axis of the sleeve with the ring being provided for example with a projection which is disposed between adjacent axial surfaces of neighboring pipe shells or pipe layers, but being preferably fixed to only one of these pipe shells. Through the mutual support of the flanges of the pipe shells, the provision of only one shoulder at the pipe ends is sufficient even at great dimensions (nominal widths over 1000 mm), so that the enlargement at the end of the pipe and also its prolongation in axial direction can be kept small in comparison to the design as set forth above. The pipe shells are, however, axially movable relative to each other only within the cylinder part, with the pipe shells becoming effective simultaneously and evenly during load upon the pipes, and yet the design allows a considerable simplification of the attachment of the slip layers. The design of the pipe connection in accordance with the invention thus facilitates the making thereof and improves the utilization of material in comparison to the coupling as set forth above. Furthermore, in case the plastic sleeve is made through winding, the design of the pipe connection in accordance with the invention allows a reduction of the winding angle of the outermost shell relative to the generatrix so that the stiffness of the outer shell is augmented. This effect is accomplished by reducing the axial opening of the outer shell in comparison to known designs in which the stepped configuration of the shoulders requires a relatively great outer diameter of the outer shell. The winding angle of the one support shell is defined in accordance with the Clairaut's law by the ratio of the largest and smallest diameter of the shell according to the formula $$\sin \alpha = \frac{\text{diameter of axial opening}}{\text{diameter of cylinder part}}$$

The ability to reduce the axial opening of the outer shell and thus to reduce the winding angle results in an increase of the stiffness of the outer shell so that a thickening of the outer shell and the provision of slip surfaces between the shells in cases of smaller loads can be completely omitted. However, it is suitable to provide within the cylinder part of the shells a slip surface between the shells in order to compensate possible tensions.

In accordance with a further development of the invention, a particular good support of the pipe shells is attained when the flange of the second pipe shell or pipe layer which follows the innermost pipe shell or pipe layer bears upon the flange of the innermost pipe shell or pipe layer as well as upon the shoulder of the pipe, with the flange of the innermost pipe shell also bearing upon the shoulder which is preferably being of stepped configuration, with the preferably rectangular surfaces of each step defining the support area for the flange of the pipe shells. The provision of such a gradation allows a continuous flattening outwards of the winding angle of the individual shells when the shells are made through winding. This is desired because the tensile strength of a shell improves with increasing approximation of the winding angle to the axial direction of the shell. The gradation of the shoulder affords the best possibility of a continuous winding with reduction of the winding angle, whereby a sudden change of the winding angle and a resulting jump in the stiffness are prevented which otherwise would negatively influence the strength.

In further development of the invention, an anchoring of adjacent shells can be improved by surrounding the inner ends of the flanges of the innermost pipe shells or pipe layers with preferably axially extending angled sections of the flanges of the second shell which follows the innermost shell. In such a design, the flange of the innermost shell is protected by the flange of the subsequent shell. In accordance with a particular feature of the invention, the strength of the flange of the innermost pipe shell is further improved when the outer surface of the flange of the innermost pipe shell or pipe layer defines an obtuse angle with the outer surface of the pipe shell or pipe layer, with the outer surface preferably extending coaxial to the axis of the pipe.

According to a further feature of the invention, the contact surface of the flange of the innermost pipe shell or pipe layer at the shoulder may be inclined relative to the axis of the pipe by an acute angle, with the shoulder of the overlapped pipe including a complementary undercut. This design of the connection according to the invention results in a particular favorable mounting of the pipe shells to the overlapped pipe.

In accordance with a further embodiment, the flanges of the pipe shells incorporate reinforcement insets, in particular rings of L-shaped cross section, which are made of a material of increased strength in comparison to the material of the shells, and are especially made of steel or fine metal strands or high-modulus filaments and webs like boron-carbide filaments and whisker filaments. This design promotes the stiffness and allows a complete mastery of problems of force introduction and force transfer which especially are encountered in the end portions.

BRIEF DESCRIPTION OF THE DRAWINGS

The invention will be described in more detail with reference to the drawing

DETAILED DESCRIPTION OF PREFERRED EMBODIMENTS

Figure 1:
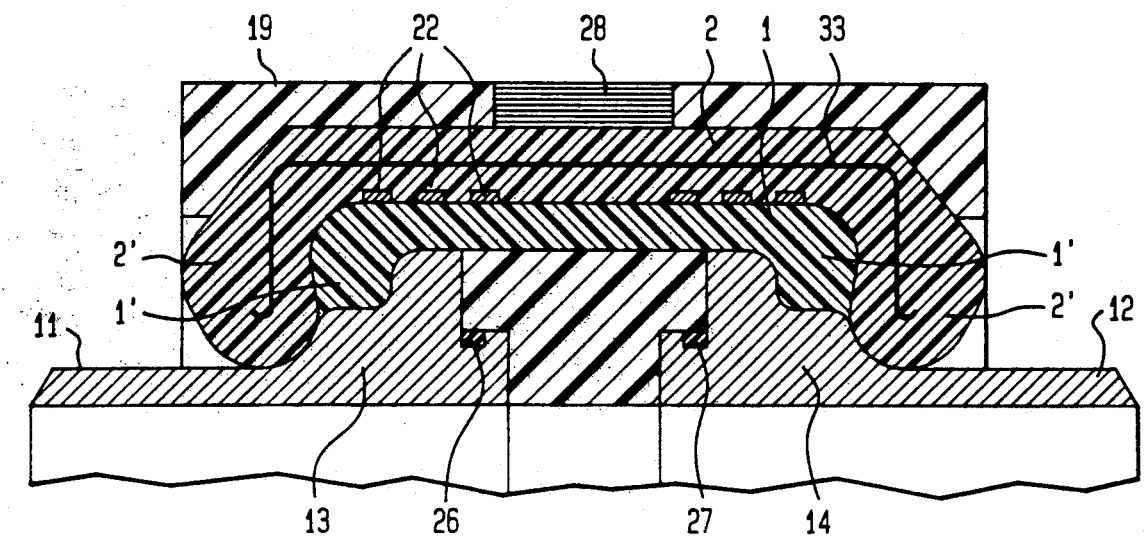
FIG. 1 is a longitudinal view of a first embodiment of a form-fitting and material-locking connection in accordance with the invention.

The connection includes an overlapping, reinforced plastic sleeve which is subdivided into a number of superimposed pipe shells 1–10 or pipe layers, with each end thereof including a flange 1'–10' oriented toward the axis of the sleeves. The pipe shells or pipe layers 1–10 are completely separated from each other and thus can be deformed independently from each other in axial direction of the sleeve, e.g. when the form-fitting and material-locking connection is subjected to tensile loads. The pipe shells 1–10 or the pipe layers overlap at least one, or, as shown in the illustrated exemplified embodiments, preferably two pipes 11, 12 which are made in particular of metal. The end of the plastic sleeve may be wound, pressed or cast to the end of the overlapped pipe 11, 12. The flanges of the innermost pipe shells 1, 3, 5, 7 and 9 hook onto a shoulder 13–18 at each end of the overlapped pipe 11, 12. The outermost pipe shell 2, 4, 6, 8, 10 is enclosed by a coupling ring 19 at least at its end portion.

In the illustrated exemplified embodiments according to FIGS. 1–5, the flanges 1'–10' of the pipe shells 1–10 or pipe layers support each other. In the embodiment according to FIGS. 4 and 5, a ring 20 or a ring winding made of fine metal strands is arranged between the flanges 7', 8' or 9', 10' of neighboring pipe shells 7, 8 or 9, 10 and extends essentially perpendicular to the axis of the pipe. The ring 20 may be provided with a projection 21 which is arranged between adjacent axial surfaces of neighboring pipe shells 7, 8 or 9, 10 and is preferably fixed to only one of these pipe shells 7 or 8, 9 or 10 so as not to impede a relative axial displacement of the pipe shells 7, 8, or 9, 10 when the latter are subjected to loads.

According to the embodiment of FIG. 1, the flange 2' of the second pipe shell 2 which follows the innermost pipe shell 1 bears upon the flange 1' of the innermost pipe shell as well as upon the shoulder 13, 14 of the overlapped pipe 11, 12, with the flange 1' of the innermost pipe shell also bearing upon the shoulder 13, 14. In this case, the shoulder 13, 14 is of stepped configuration and the essentially rectangular surfaces of each step define support surfaces for the flanges 1', 2' of both pipe shells 1, 2, with the gradation ascending toward the end of the sleeve so that a particular favorable utilization of material to be provided for the formation of the shoulder at the end of the pipe 11 and 12, respectively, is attained. Both pipes 11 and 12 are separated from each other in axial direction by an essentially T-shaped ring 25 of insulating glass fiber reinforced plastic material. O-rings 26, 27 may be provided for effecting a seal between the spacer ring 25 and the pipes 11, 12. Analogous designs of the spacer rings 25 and arrangements of the O-rings 26, 27 are also shown in the embodiments according to FIGS. 2–5, with the even-numbered figures showing a left half of a pipe coupling and the odd-numbered figures illustrating the right half of a pipe connection.

Figure 2:
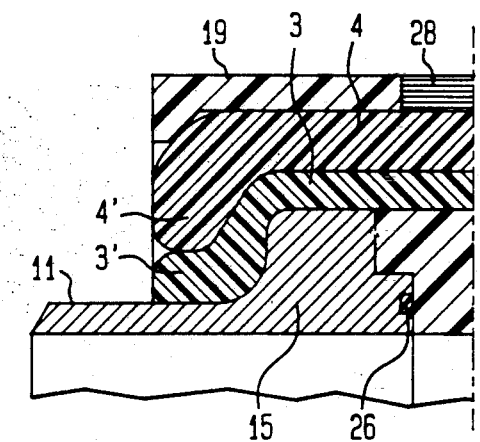
FIG. 2 is a longitudinal view of a second embodiment of a form-fitting and material-locking connection in accordance with the invention.
Figure 3:
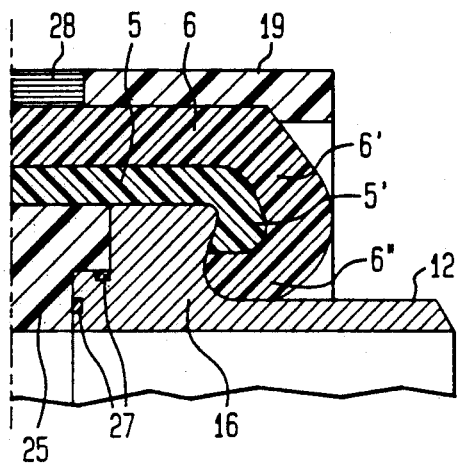
FIG. 3 is a longitudinal view of a third embodiment of a form-fitting and material-locking connection in accordance with the invention.

In the embodiments as shown in FIGS. 2 and 3, the outer surface of the flange 3', 5' of the innermost pipe shell 3, 5 defines an obtuse angle with the outer surface area of the pipe shell 3, 5, with the outer surface area extending essentially coaxial to the axis of the pipe.

A particular favorable mutual bracing of the ends of neighboring pipe shells 5, 6 can be seen from FIG. 3 of the drawing. In this case, the inner ends of the flanges 5' of the innermost pipe shell 5 are surrounded by essentially axially extending angled sections 6'' of the flanges 6' of the second shell 6 which follows the innermost shell 5, with the contact surface of the flange 5' of the innermost pipe shell 5 with the shoulder 16 being inclined by an acute angle relative to the axis of the pipe. The shoulder of the overlapped pipe 12 includes a complementary undercut.

As shown in FIG. 1, for accomplishing an essential approximation, rings 22 may be placed upon the outer surface of the innermost pipe shell 1, especially in the area of both its ends, with the rings 22 being made of a material of increased strength in comparison to the material of the pipe shell 1 or 2, and being especially made of steel or another metal but also of fine metal strands. For reinforcement, the flanges 9', 10' of the pipe shells 9, 10 may alternatively or additionally incorporate reinforcement insets, in particular in form of L-shaped rings 23, 24, which are made of a material of increased strength in comparison to the material of the shells, especially of fine steel strands or of fine metal strands. These reinforcement insets promote improved strength properties of the shells in the area of the flanges, in which area the load is most unfavorable (three-dimensional state of stress).

In accordance with further embodiments as shown in FIGS. 1–4, the shoulders 13, 14, 15, 16, 17 are each made in one piece with the pipe 11 and 12, respectively. For connections with great diameter, it is preferred to shape the shoulder for supporting the pipe shells 9 on a pre-fabricated bead-type ring shaped support member 18 which is fixedly secured to the end of the pipe 12 through welding, gluing or like connection.

Figure 4:
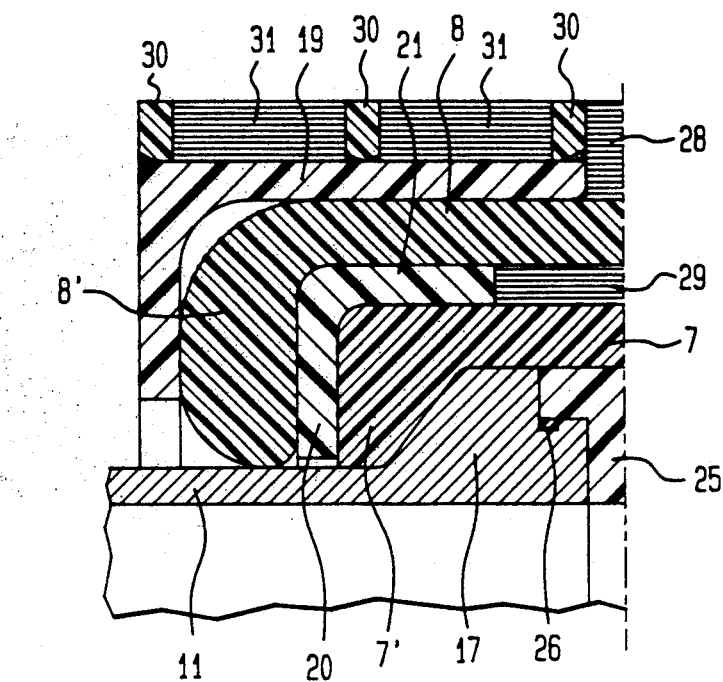
FIG. 4 is a longitudinal view of a fourth embodiment of a form-fitting and material-locking connection in accordance with the invention.
Figure 5:
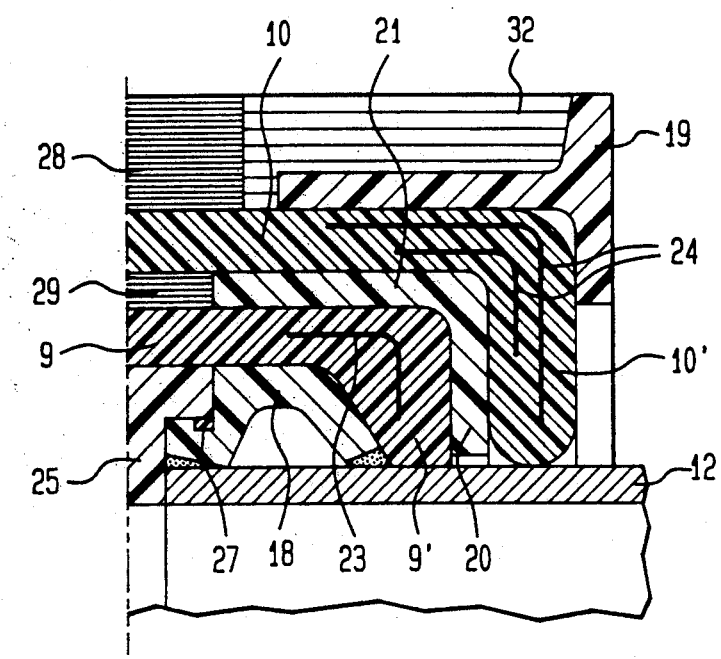
FIG. 5 is a longitudinal view of a fourth embodiment of a form-fitting and material-locking connection in accordance with the invention.

Certainly, the shoulder may be formed as weldment by joining several ring-shaped portions. The space between both rings 19, which are slid over the ends of the outer shell 2, 4, 6, 8, 10, may be bridged through radial windings 28. Radial windings 29 may be arranged between the projections 21 of the disks 20, as shown in FIGS. 4 and 5. The coupling ring 19 may be provided about its circumference with axially spaced rings 30, with the space between these rings also being filled with radial windings 31.

In case of the embodiment according to FIG. 5, the coupling ring 19 is of T-shaped cross section and bears externally with its shank upon the outer shell 10. The space between the outer surface of the shank and the end of the T-flange may be filled with a radial winding 32.

As shown in FIG. 1, the outer pipe shell 2 may be reinforced with several traversing intermediate insets or webs of high-modulus filaments, e.g. made of boron-carbide or whiskers.

I claim:

1. A form-fitting connection for attachment to an end portion of at least one pipe, comprising: a reinforced plastic sleeve which includes more than one superimposed shell having end flanges which are directed toward the axis of the sleeve and being separated from each other so as to be deformable independently from each other in axial direction of the sleeve, said sleeve overlapping the end portion of the pipe, with the flanges (1'-10') of the innermost shell hooking onto a shoulder at the end portion of the pipe, and the flanges of the shells mutually supporting each other in a superimposed relationship.

2. The connection defined in claim 1 wherein the flange (2') of the second pipe shell (2) which follows said innermost pipe shell (1) bears upon the flange (1') of the innermost pipe shell as well as upon the shoulder (13, 14) of the pipe (11, 12), with the flange (1') of the innermost pipe shell (1) also bearing upon said shoulder (13, 14).

3. The connection defined in claim 2 wherein each shoulder (13, 14) of the pipe (11, 12) is of stepped configuration, with each step defining a support surface for the flanges of the shells.

4. The connection defined in claim 3 wherein each step is of rectangular configuration.

5. The connection defined in claim 1 wherein the axial inner ends of the flanges (5') of the innermost pipe shell (5) are enclosed by angled sections (6") of the flanges (6') of the second shell (6).

6. The connection defined in claim 5 wherein the flange (3',5') of the innermost pipe shell (3; 5) has an outer surface which extends at an obtuse angle to the outer surface area of the shell (3;5).

7. The connection defined in claim 6 wherein the outer surface area of the shell (3; 5) extends coaxial to the axis of the pipe.

8. The connection defined in claim 5 wherein said angled sections of the flanges (6') of said second shell (6) extend in axial direction.

9. The connection defined in claim 1 wherein the flange (5') of the innermost pipe shell (5) has a contact area which bears upon a shoulder (16) of the pipes and is inclined at an acute angle relative to the axis of the pipe, with the shoulder (16) of the overlapped pipe (12) including a complementary undercut.

10. The connection defined in claim 1, and further comprising at least one ring (22) placed upon the outer surface of the innermost pipe shell (1) and made of a material of increased strength in comparison to the material of the pipe shell (1; 2).

11. The connection defined in claim 10 wherein said ring (22) is made of steel.

12. The connection defined in claim 10 wherein said ring (22) is made of suitable wound fine metal strands.

13. The connection defined in claim 10 wherein said ring (22) is placed upon the outer surface of the innermost pipe shell (1) in the area of its axial ends.

14. The connection defined in claim 1, and further comprising reinforcement insets embedded in the flanges (9', 10') of the pipe shells (9, 10) and made of a material of increased strength in comparison to the material of the shells (9, 10).

15. The connection defined in claim 14 wherein said reinforcement insets are rings (23, 24) of L-shaped cross section.

16. The connection defined in claim 14 wherein said reinforcement insets are made of fine metal strands.

17. The connection defined in claim 14 wherein said reinforcement insets are made of steel.

18. The connection defined in claim 1 wherein the sleeve has an outermost shell which is reinforced by several traversing intermediate insets (33) of high-modulus filaments.

19. The connection defined in claim 18 wherein the filaments are made of boron-carbide.

20. The connection defined in claim 18 wherein the filaments are made of whiskers.

21. The connection defined in claim 1, and further comprising a ring (20) interposed between two shells of said sleeve.

22. The connection defined in claim 21 wherein said ring (20) includes a projection (21) which is arranged between adjacent axial surfaces of neighboring shells.

23. The connection defined in claim 22 wherein said projection (21) is fixed to only one of said shells.

24. The connection defined in claim 1, and further comprising a coupling ring enclosing said outermost shell at least in the end area of said outermost shell.

25. The connection defined in claim 1, and further comprising a support member (18) attached to the end of the pipe for supporting said sleeve.

26. The connection defined in claim 25 wherein said support member is a bead-like prefabricated ring which is securely fixed to the pipe (12).

* * * * *